United States Patent [19]

Yoshida

[11] Patent Number: 5,420,843
[45] Date of Patent: May 30, 1995

[54] RECORDING MEDIUM POSITION INDICATING APPARATUS AND METHOD

[75] Inventor: Eiji Yoshida, Tokorozawa, Japan

[73] Assignee: TEAC Corporation, Japan

[21] Appl. No.: 269,960

[22] Filed: Jun. 30, 1994

Related U.S. Application Data

[63] Continuation of Ser. No. 998,940, Dec. 29, 1992, abandoned.

[30] Foreign Application Priority Data

Jan. 8, 1992 [JP] Japan .................................. 4-001572

[51] Int. Cl.$^6$ .............................................. G11B 7/00
[52] U.S. Cl. ......................................... 369/58; 369/47; 369/48
[58] Field of Search ....................... 369/47, 48, 53, 54, 369/58, 59, 32, 43; 360/75, 71, 72.1

[56] References Cited

U.S. PATENT DOCUMENTS

| | | | |
|---|---|---|---|
| 4,862,439 | 8/1989 | Ando et al. | 369/58 |
| 4,916,682 | 4/1990 | Tomoda et al. | 369/58 |
| 5,138,600 | 8/1992 | Aoyagi | 369/32 |

Primary Examiner—Georgia Y. Epps
Assistant Examiner—Muhammad N. Edun
Attorney, Agent, or Firm—Andrus, Sceales, Starke & Sawall

[57] ABSTRACT

A reading head pauses at a predetermined position on a selected one of a plurality of series information recorded, for example, on a CD (compact disc). Either a preceding distance between a current position of the reading head on the series of information and a starting position on the series of information, at which starting position the series of information starts, or a remaining distance between the current position on the series of information and an ending position on the series of information, at which ending position the series of information ends, is indicated. The above indication is switched automatically in response to the pausing of the reading head so that the indication of a first one of the preceding distance and the remaining distance is changed to the indication of a second one thereof. Then after elapsing of a predetermined time period, the indication is automatically switched from the indication of the second one of the predetermined distance and the remaining distance to the indication of the first one thereof.

4 Claims, 5 Drawing Sheets

RECORDING MEDIUM POSITION INDICATING APPARATUS AND METHOD

This application is a continuation application of Ser. No. 07/998,940 filed Dec. 29, 1992, now abandoned.

BACKGROUND OF THE INVENTION

The present invention relates to a recording-medium position indicating apparatus and a method. The apparatus and method are used for a recording medium having information for positions thereon and main information, both kinds of information being written thereon.

One example of the above-mentioned recording medium is a CD (compact disc) for music. As shown in FIG. 1, such a CD has time information $I_T$ and main music information $I_M$, the main music information comprising tunes, the time information being information corresponding to position information concerning the main information. The time information indicates for every tune how much time is required for playing the current tune (hereinafter, the term "the current tune" means the tune which the CD player plays currently) between a tune starting position Pts of the current tune and another position in the current tune where a reading head for reading the tune information from the CD is positioned, or the time required for playing the current tune between the position where the reading head is currently positioned and a tune ending position Pte of the current tune. A CD player for such a CD has an elapsed time indicating mode and a remaining time indicating mode. These time indicating modes can be switched by an operator as desired. In the elapsed time indication mode, during playing of the current tune, an time indicator provided to the CD player indicates time required for playing the current tune from the tune starting position Pts of the current tune to the position of the current tune where the reading head is currently positioned. Further, In the remaining time indication mode, during playing of the current tune, the time indicator indicates another time which time is required for playing the current tune from the position of the current tune where the reading head is currently positioned to the tune ending position Pte of the current tune.

When such a CD player is used for business, the remaining time indicating mode is normally used because an operator has to know when the tune ends so as to plan the schedule.

Such a CD player for business use may have an auto cue function which automatically searches for a sound starting position from where sound of a selected tune starts, the function then causing the reading head to pause at the sound starting position of the selected tune. Normally, as shown in FIG. 1, the sound starting position Pss of the tune does not coincide with the above-mentioned tune starting position Pts, that is, there is a non-sound range, between the tune starting position Pts and the sound starting position Pss, in the tune, in which range no sound occurs when the reading head scans for music information.

Searching a tune in the above-mentioned elapsed time indication mode through the above-mentioned auto cue function results in a pausing state of the CD player, where the above-mentioned time indicator indicates an elapsed time such as "00 MINUTES. 03 SECONDS.". This indication means that the elapsed time required for playing between the tune starting position Pts and the position in the tune where the reading head is currently positioned is three seconds. This elapsed time is the above-mentioned non-sound range of the tune. This indication enables the operator to confirm that the selected tune has been found as the result of the search, as the operator is able to verify that only a few seconds have elapsed.

On the other hand, Searching for the tune in the above-mentioned remaining time indication mode through the above-mentioned auto cue function also results in a pausing state of the CD player where the above-mentioned time indicator indicates a remaining time such as "10 MINUTES. 45 SECONDS.", for example. As mentioned above, the remaining time indication mode is normally selected in a CD player for business use. This indication means that the remaining time required for playing between the position in the tune where the reading head is currently positioned and the tune ending position of the tune is 10 minutes and 45 seconds. This indication does not enable the operator to determine whether the current state is the state where the tune has been found as the result of the search, that is, is the state where the reading head is positioned on the sound starting position, or whether the current state is the state where a part of a tune has been already played, that is, the state where the reading head is not positioned on the sound starting position, but rather is positioned near a middle of a tune. This is because the time required for playing a tune varies depending on each tune; thus, unless the operator previously knows the time for playing the entire tune, the operator cannot determine the current state. Further, the operator does not know the time required for the reading head to effect scanning of the non-sound range of the tune.

Switching of the time indicating mode from the remaining time indication mode to the elapsed time indication mode can result in enabling the above-mentioned determination of the state and thus enables the operator to know the time required for the non-sound range. However, such an extra operation as the switching is problematic in business applications. An alternative method for solving the problem may be considered, in which method the CD player has two time indicators respectively indicating the remaining time and the elapsed time. However, the alternative method causes another problem in that the extra time indicator creates a rise in manufacturing cost of the CD player, and in that the extra indicator interferes with reduction in size of the operation panel of CD players. The alternative method causes another problem in that the operator may mistake one time indicator for the other time indicator thus resulting in an erroneous operation by the operator.

SUMMARY OF THE INVENTION

An object of the present invention is to provide an recording-medium position indicating apparatus and a method, which apparatus has only one time indicator means, and wherein even if the apparatus executes a search for a tune in the remaining time indicating mode through the above-mentioned auto cue function, an operator can confirm that the specified tune has been found as the result of the search. Here, "time" corresponds to a value corresponding to a distance between two positions in the tune, "tune" corresponds to a below-described series of first information, and "remaining time" corresponds to a below-described remaining distance value.

To achieve the above-mentioned object of the present invention, the apparatus according to the present invention comprises:

reading means for reading, by means of a reading head, a plurality of series of first information, and second information from the recording medium;

searching means for searching for, based on a specification according to which one series of first information of the plurality of series of first information is to be searched for, through the reading means, a starting position of a series of first information to be read, the searching means then causing the reading head to pause at the determined starting position of the series of first information to be read;

indicator means for indicating one of a preceding distance value defined below and a remaining distance value defined below;

preceding distance value indicating means for deriving, based on the second information read through the reading means, the preceding distance value corresponding to a distance between a position in one series of first information of the plurality of series of first information where the reading head is positioned currently and the starting position of the series of first information, the preceding distance value indicating means then causing the indicator means to indicate the preceding distance value;

remaining distance value indicating means for deriving, based on the second information read through the reading means, the remaining distance value corresponding to a distance between a position in one series of first information of the plurality of series of first information where the reading head is positioned currently and an ending position of the series of first information, the remaining distance value indicating means then causing the indicator means to indicate the remaining distance value;

indication switching means for switching, in a first of two indicating states, in which one state of the two states the preceding distance value indicating means causes the indicator means to indicate the preceding distance value and in which another state of the two indicating state the remaining distance value indicating means causes the indicator means to indicate the remaining distance value, when the reading head pauses as a result of the action by the searching means, from the first indicating state to the second indicating state, the indication switching means then, after a predetermined period, switching from the second indicating state back to the first indicating state.

In the above-mentioned configuration, even when the remaining distance value indicating means is in a state causing the indicator means to indicate the remaining distance value, when the searching means, after finding of the series of first information, causes the reading head to pause at the starting position of the series of first information, the indication switching means switches the displayed indication from the remaining distance value indication to the preceding distance value indication (corresponding to the above-mentioned elapsed time indication), using the preceding distance value indication means, for a predetermined period. The preceding distance value indication for the predetermined period, because the indicated value is a very small value, enables the operator to confirm that the specified tune has been found as the result of the search.

Other objects and further features of the present invention will become more apparent from the following detailed description when read in conjunction with the accompanying drawings.

DESCRIPTION OF THE PREFERRED EMBODIMENTS

Figure 2:
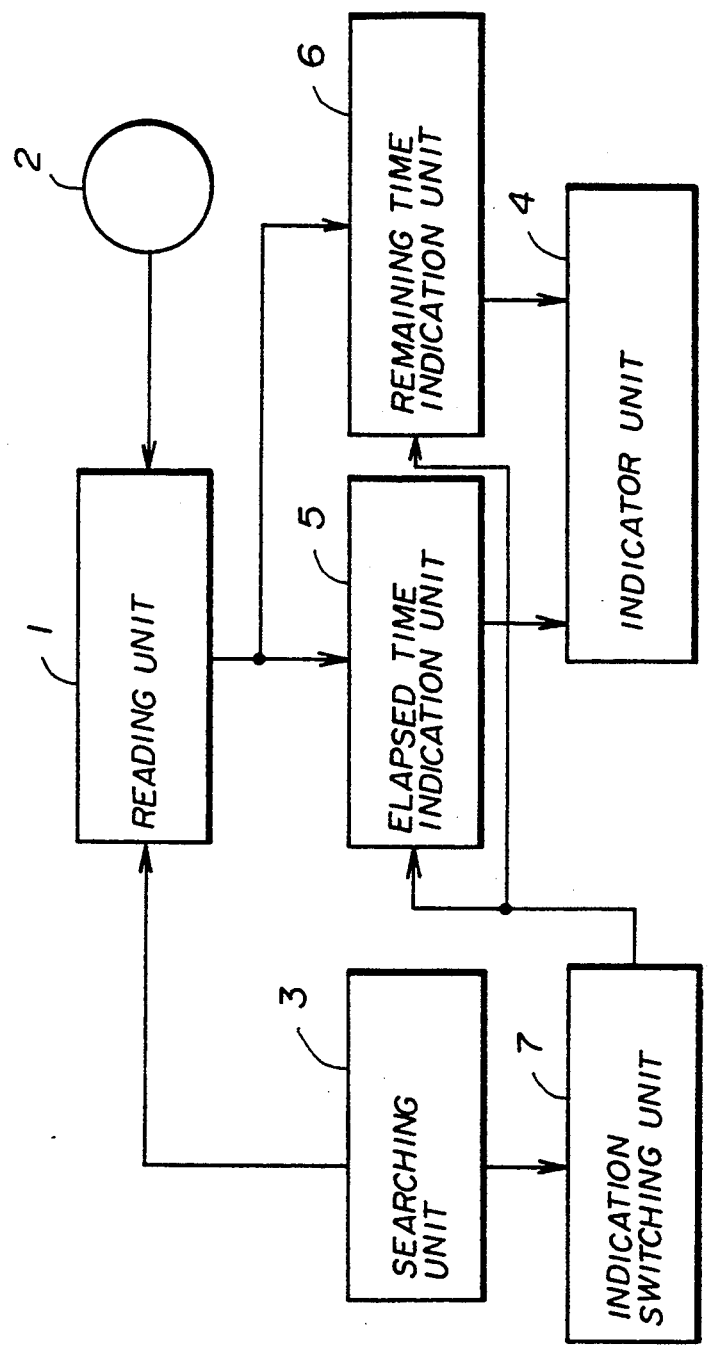
FIG. 2 shows a function block diagram of an apparatus for reading from a recording medium of a first embodiment according to the present invention.

Basic functions, regarding the present invention, of a recording-medium reading apparatus employing a first embodiment of a recording-medium position indicating apparatus according to the present invention is described below with reference to FIG. 2.

A reading unit 1 reads information from a recording medium 2 through a reading head of the reading unit 1. The recording medium 2 has a plurality of series of main information (corresponding to a plurality of series of first information) constituting main information thereof, and time information (substantially, position information, corresponding to a second information) that indicates a time required for the reading unit 1 to read data from the recording medium, from a starting position of the series of main information to another position, in the series of main information, where the reading head currently located; or a time required to read from the position in the series of main information, where the reading head is currently placed to an ending position of the series of main information.

A searching unit 3 searches for a series of main information of the plurality of series of main information. In the search, the searching unit 3 searches for a starting position of the series of main information to be read, thus causing the reading head to pause at the starting position thereof.

A elapsed time indicating unit 5 derives, based on the time information read by the reading unit 1, elapsed time required for the reading unit 1 to read data from the recording medium 2 between the starting position of the series of main information to be read and another position where the reading head is currently positioned in the series of main information to be read. Then the elapsed time indication unit 5 causes the indicator unit 4 to indicate the elapsed time.

A remaining time indicating unit 6 derives, based on the time information read by the reading unit 1, remaining time required for the reading unit 1 to read data from the recording medium 2 between the position where the reading head is currently positioned in the series of main information to be read and an ending position of the series of main information to be read. Then the elapsed time indication unit 6 causes the indicator unit 4 to indicate the remaining time.

When the reading head pauses at the starting position of the series of main information as a result of the search of the searching unit 3, an indication switching unit 7 switches, when the indicator unit 4 indicates the remaining time, from the indication of the remaining time to the indication of the elapsed time, the indication of the elapsed time being activated by the elapsed time indicating unit 5, and effected by the indicator unit 4. Then, after a predetermined period elapses, the indication switching unit 7 switches indication from the indication of the elapsed time to the indication of the remaining time.

Figure 3:
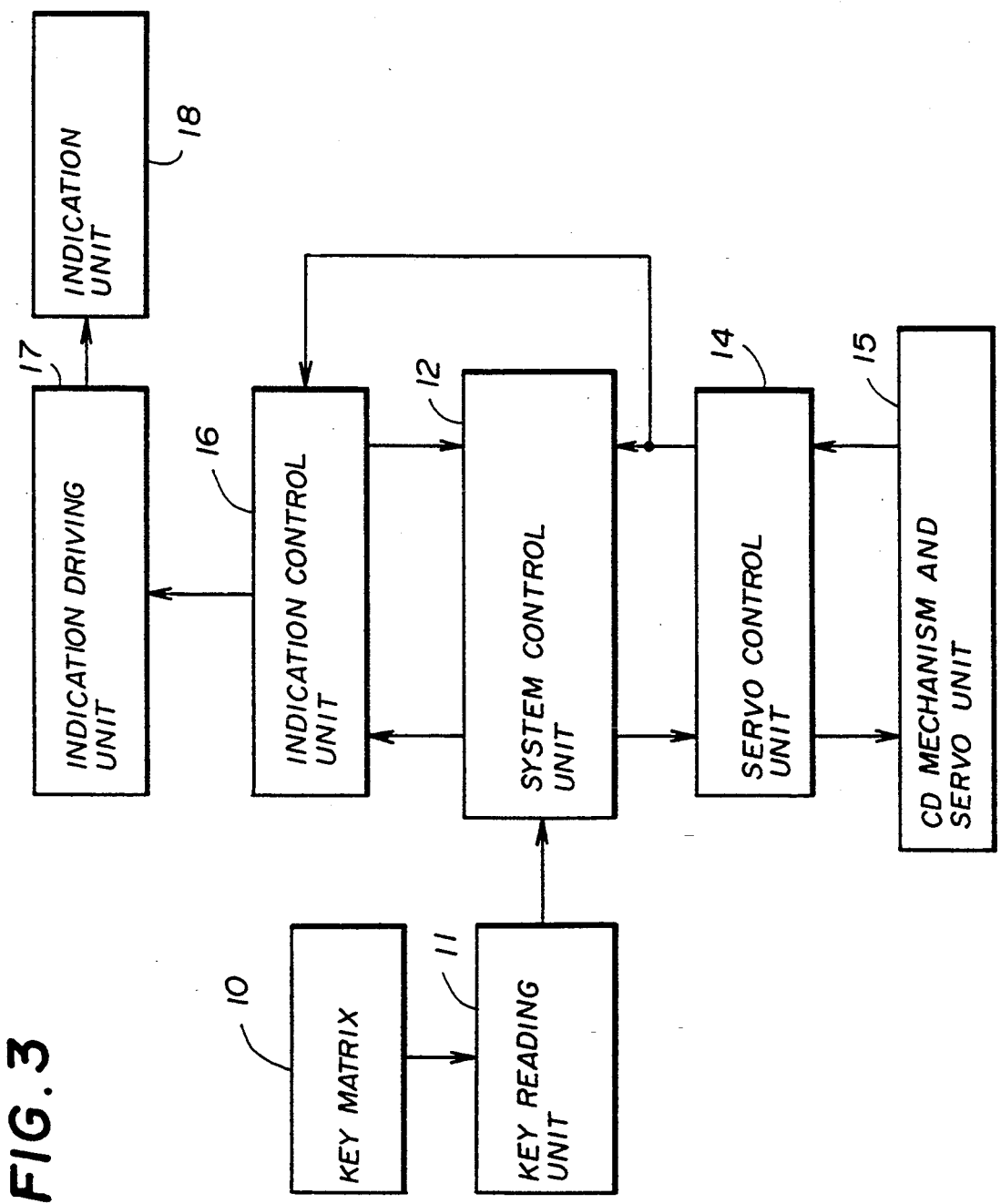
FIG. 3 shows a block diagram of a CD player of a second embodiment according to the present invention.

A construction of a CD player employing a second embodiment of a recording-medium positions indicating apparatus according to the present invention will now be described with reference to FIG. 3, particularly in aspects concerning of the present invention.

A key matrix 10 has various operation keys. A key reading unit 11 reads states of the operation keys resulting by operation of the keys by an operator. The key reading unit 11 then provides the read key state information to a system controlling unit 12.

The system control unit 12, outputs commands for directing a servo controlling unit 14 in response to specifications specifying various operations such as "play", "stop", "pause", "tune search", "auto cue", and other operations, these specifications having been specified by the keys on the key matrix 10 being operated by the operator.

The servo controlling unit 14, according to the commands output from the system control unit 12, controls a CD mechanism and servo unit 15 so as to control an optical pickup drive, a disc driving motor, and other components included in the CD mechanism and servo unit 15.

The CD mechanism and servo unit 15 outputs information read from a CD through the optical pickup, the information read including information for a tune number, elapsed time, and remaining time. Such information read is provided to the servo control unit 14. Further, the information read is then provided to system control unit 12 and the indicating control unit 16.

The indicating control unit 16, according to a specification provided by the system control unit 12, outputs indication data for directing an indication driving unit 17 to cause an indication unit 18 to indicate the tune number and one of the elapsed time or the remaining time.

Figure 4:
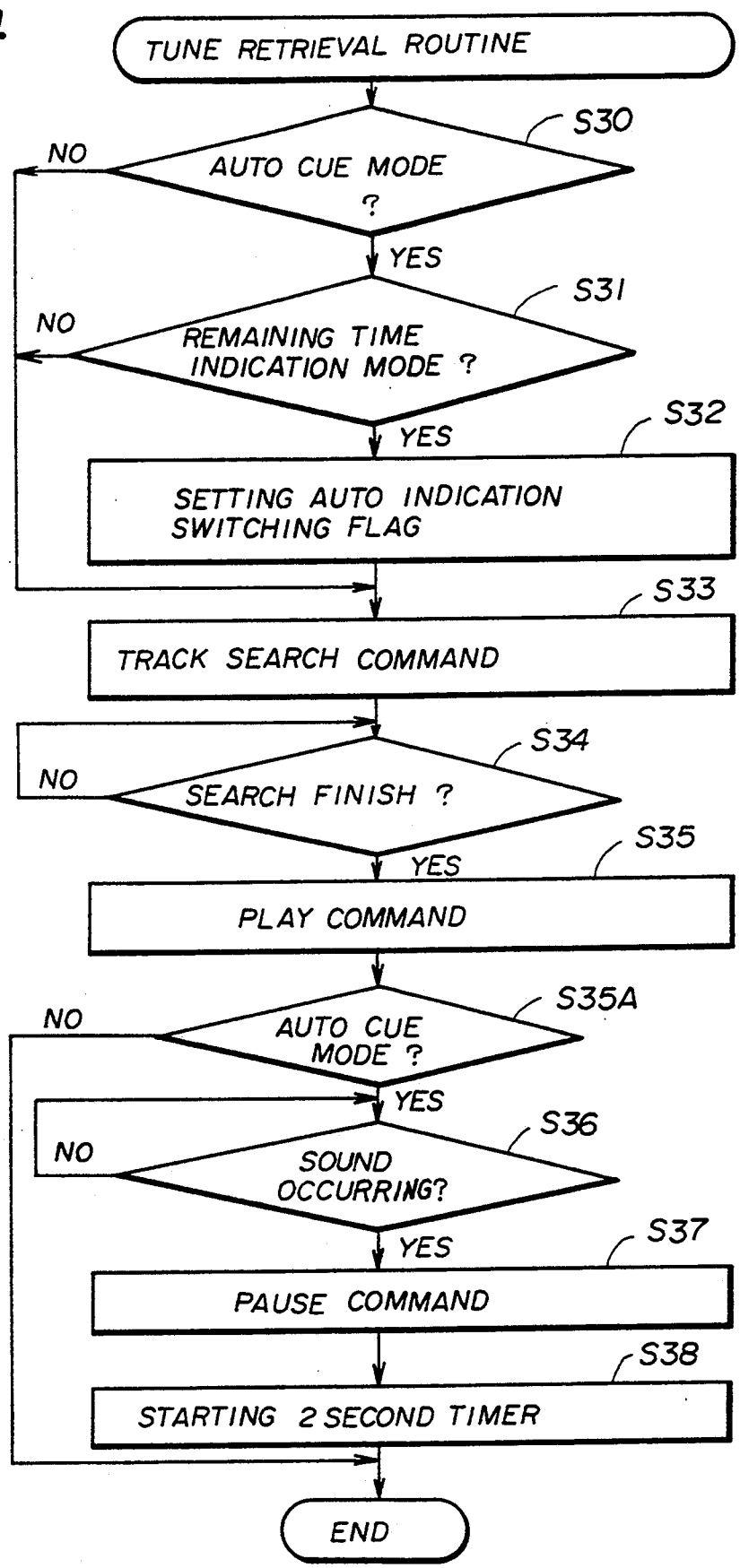
FIG. 4 shows an operation flow chart for a tune searching routine in the CD player shown in FIG. 2.

An operation flow of a tune search (track search) routine executed by the system control unit 12 will be described with reference to FIG. 4. The routine is initiated as a result of operation of a track search key on the key matrix 10. A step (hereinafter the term "step" will be omitted so as to abbreviate to, for example, "S30") S30 determines whether or not an auto cue mode has been set, in which mode the above-mentioned auto cue function can be utilized. In a case where it is determined that the auto cue mode has been set, S31 determines whether or not the remaining time indication mode has been set, in which remaining time indication mode the indication driving unit 17 causes the indication unit 18 to indicate the remaining time as mentioned above. In case it is determined that the remaining time indication mode has not been set, S32 sets an auto indication switching flag. Then, S33 is executed. Either in the case where it is determined in S30 that the auto cue mode has not been set, or in case where it is determined in S31 that the remaining time indication mode has not been set, S33 is executed.

In S33, the system control unit 12 provides a track search command to the servo control unit 14, thus causing the servo control unit 14 to search for a specified tune located in a CD. Then, after the servo control unit 14 has found the specified tune (the end of the search), the servo control unit 14 reports the specified tune being found to the system control unit 12 (S34), then the system control portion 12 provides a play command to the servo control unit 14 (S35). Then, S35A determines whether or not the auto cue mode has been set. In a case where it is determined that the auto cue mode has not been set, the tune searching routine is terminated.

Figure 1:
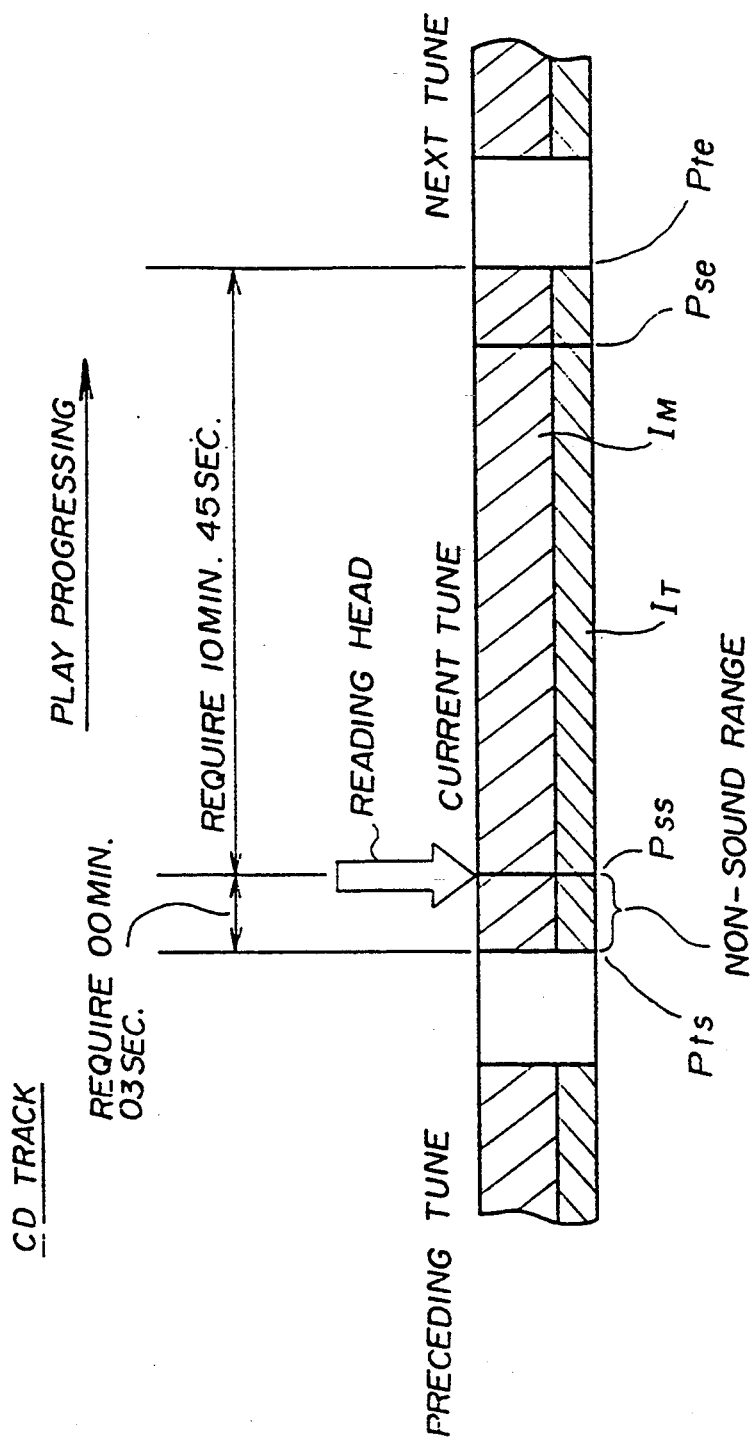
FIG. 1 shows a concept illustration of information located in a CD track.

As a result of the play command being provided, the servo control unit 14 causes the CD mechanism and servo unit 15 to play the CD, the sound of the specified tune thus occurs. That is, the optical pickup (reading head) is located just at the sound starting position Pss as shown in FIG. 1, and then the servo control unit 14 reports this sound occurrence to the system control unit 12 (S36) in a case where S35A determines that the auto cue mode has been set. The system control unit 12 then provides a pause command to the servo control unit 14 (S37) so that the servo control unit 14 causes the optical pickup of the CD mechanism and servo unit 15 to pause at the sound starting position Pss of the tune. Then, S38 starts a 2 second timer, and then the routine shown in FIG. 4 is aborted.

Figure 5:
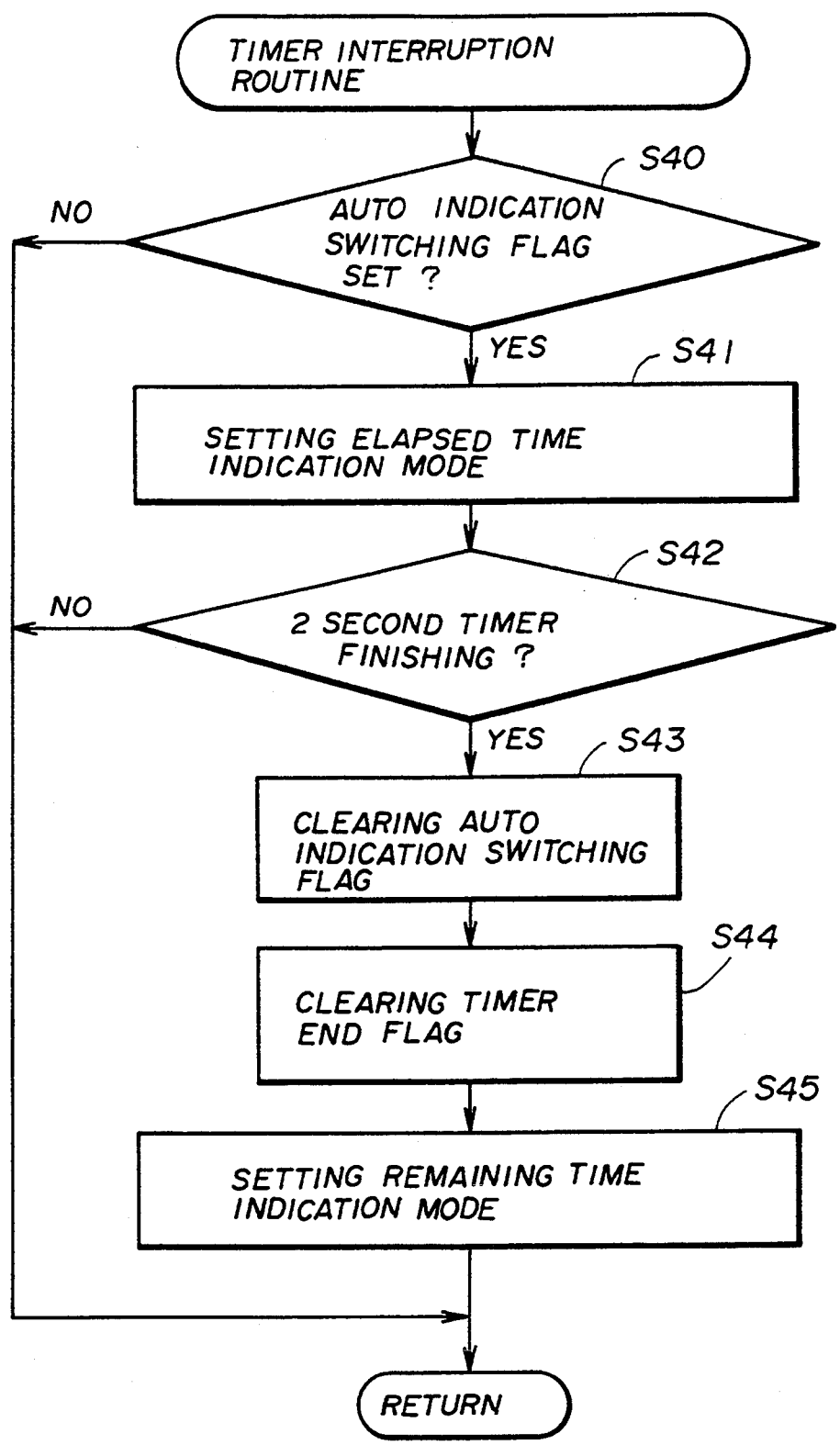
FIG. 5 shows an operation flow chart for a timer interruption routine in the CD player shown in FIG. 2.

An operation flow of a timer interruption routine executed by the system control unit 12 will be described with reference to FIG. 5. The execution of the timer interruption routine is repeated at a predetermined time intervals, for example, every several milliseconds.

S40 determines whether or not the auto indication switching flag has been set. In a case where is determined that the auto indication switching flag has been set, S41 sets an elapsed time indication mode in which an elapsed time such as mentioned above is indicated through the indication driving unit 17 by the indication unit 18 instead of indicating the above-mentioned remaining time. Then S42 determines whether or not the 2 second timer has finished the counting thereof.

In a case where it is determined that the 2 second timer has finished the counting, S43 clears the auto indicating switching flag. Then S44 clears a timer end flag, which flag was set when the 2 second timer finished counting. S42 determines whether or not the 2 second timer finishes the counting by detecting whether or not the timer end flag is set. Hence, the clearing of the timer end flag (S44) prevents S42 from determining that the 2 timer has finished the counting until the 2 second timer again starts the counting (S38).

S45 then sets the above-mentioned remaining time indication mode. Then, the timer interruption routine is terminated.

The following actions are executed as a result of the execution of the tune searching routine and the timer interruption routine. After S32 has set the auto indication switching flag as a result of the operator's initiating the tune searching routine, S40 of the timer interruption routine determines YES. Thus, S41 switches the time indication to the elapsed time indication. S42 then determines NO because the timer end flag has been cleared, as mentioned above.

On the other hand, the tune searching routine proceeds with search of the track (S33), playing (S35) and pausing (S37) successively, then the 2 second timer starts the counting (S38). The timer interrupting routine repeats the steps S40, S41 and S42 successively until the 2 second timer finishes the counting. Thus, the elapsed time indication by the indication unit 28 is kept until the steps S43, S44 and S45 are executed so that the time the indication is returned to the remaining time indication as a result of S42 determining YES after the 2 second timer finishes the counting.

In a case where it is determined in S40 that the auto indication switching mode has not been set, or in a case where it is determined in S42 that the 2 second timer has not finished the counting, the timer interrupting routine in the current cycle is terminated, and the next cycle of the timer interruption routine is initiated from S40 immediately, so as to repeat the routine as mentioned above.

As a result of execution of the above-mentioned operation flows, in a case where the specified tune is searched for through the auto cue function in the remaining time indication mode, the pause condition where the optical pickup pauses at the sound starting position of the specified tune occurs. Then, for 2 seconds, the indication unit 18 indicates the elapsed time (for example, "00 MINUTES, 03 SECONDS"). Then, after the 2 seconds elapse, the remaining time (for example, "10 MINUTES, 45 SECONDS") is again indicated by the indication unit 18. The 2 second indication of the elapsed time enables the operator to confirm that the specified tune has been found as the result of the search. Further, the operator can thus know time required for the optical pickup to scan the non-sound range between the tune starting position and the sound starting position. Further, the automatic return from the elapsed time indication to the remaining time indication gives a reliable operation behavior because the remaining time indication is normally needed for business use CD players as mentioned above. Thus, a problem that the operator mistakes the elapsed time indication for the remaining time indication, which problem may occur in a conventional CD player when the operator does not switch from the elapsed time indication to the remaining time indication, does not occur when using an embodiment of an apparatus according to the present invention.

Further, in a case where the tune searching is executed using the auto cue function in the elapsed time indication mode (thus NO in S31), the indication unit 18 indicates the elapsed time, similarly to the case where the conventional CD player is used.

Furthermore, in a case where the tune search is executed not using the auto cue function (thus NO in S30 and NO in S35A), the time indication mode is not switched, similar to the case where the conventional CD player is used. Thus, one selection performed by the operator for the auto cue mode also results in a selection for the auto indication switching. Thus, it is not needed to provide another operator-selected auto indication switching mode, in which both elapsed time and remaining time indications are switched from one to the other, because the selection of the auto cue mode substantially results in such an auto indication switching mode. The provision of another mode to be selected would cause other problems such that another selection switch would be needed, for example, thus there would exist more chances for the operator to mistake one switch for another.

Furthermore, the auto indication switching according to the present invention enables the operator to know the entire time required for the CD player play the tune from the tune starting position Pts to the tune ending position Pte by merely adding the elapsed time to the remaining time, without requiring any extra operation by the operator.

Further, the present invention is not limited to the above described embodiments, and variations and modifications may be made without departing from the scope of the present invention.

What is claimed is:

1. A recording-medium position indicating apparatus for a recording medium having a plurality of series of music tune information written thereon, each of said series of tune information having a non-sound range of a predetermined length, through which non-sound range no significant sound information is present, and a range of sound information, said non-sound range starting from a starting position at which the tune information starts, said apparatus comprising:
   a reading head for reading a selected one of the series of tune information written on the recording medium;
   indicating means having a single display for indicating either a preceding distance between a current position on the selected one of the series of information, at which current position said reading head is located, and the starting position of the selected one of the said series of tune information, or a remaining distance between said current position and an ending position on the selected one of said series of tune information, at which ending position the selected one of the said series of information ends, said indicating means ordinarily indicating the remaining distance;
   pausing means for causing said reading head to scan the non-sound range of the selected one of said series of tune information, said pausing means causing said reading head to pause at the position on the selected one of the series of tune information where sound information first occurs; and
   switching means for automatically switching the indication of said indicating means in said display in response to the pausing of said reading head caused by said pausing means, so that the indication of the remaining distance is changed to the indication of the preceding distance, said switching means then, after the elapse of a predetermined time period, automatically switching the indication from an indication of preceding distance to an indication of the remaining distance.

2. The recording-medium position indicating apparatus, according to claim 1, wherein said indicating means indicates said preceding distance in terms of the corresponding time taken for said reading head to read a portion corresponding to said preceding distance of the selected series of information on said recording medium, and indicates said remaining distance in terms of the corresponding time required for said reading head to read a portion corresponding to said remaining distance of the selected series of information on said recording medium.

3. The recording-medium position indicating apparatus according to claim 1 wherein said recording-medium position indicating apparatus further comprises mode switching means coupled to said switching means for operating said switching means to cause said indicating means to indicate the remaining distance, once the reading head commences reading sound information.

4. A recording-medium position indicating method for a recording-medium having a plurality of series of music tune information written thereon, each of said series of tune information having a non-sound range of predetermined length, through which non-sound range no significant sound information is present, and a range of sound information, said non-sound range starting from a starting position at which the tune information starts, said method comprising the steps of:

indicating a remaining distance between a current position on the selected one of said series of tune information, at which current position a reading head is currently located, and an ending position on the selected one of said series of tune information, at which ending position said series of tune information ends;

causing said reading head to scan the non-sound range of the selected one of said series of tune information and to pause at the position in the selected one of said series of tune information where sound information first occurs;

switching the indication in response to the pausing of said reading head so that the indication of the remaining distance is changed to the indication of the preceding distance between the current position on the selected one of said series of tune information and the starting position of the selected one of the series of tune information; and after the elapse of a predetermined time period, switching the indication from an indication of the preceding distance to an indication of the remaining distance.

* * * * *